United States Patent
Masui et al.

(10) Patent No.: US 7,484,104 B2
(45) Date of Patent: Jan. 27, 2009

(54) INFORMATION PROCESSOR AND INFORMATION PROCESSING METHOD FOR COOPERATIVE OPERATION OF JOB PROCESSOR

(75) Inventors: Takanori Masui, Ebina (JP); Masanori Satake, Ebina (JP); Tatsuhiko Yokohama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 787 days.

(21) Appl. No.: 10/660,560

(22) Filed: Sep. 12, 2003

(65) Prior Publication Data

US 2004/0192426 A1    Sep. 30, 2004

(30) Foreign Application Priority Data

Mar. 25, 2003    (JP)    ............................. 2003-081918

(51) Int. Cl.
*A63F 9/24*    (2006.01)
(52) U.S. Cl. .......................................... 713/189; 726/2
(58) Field of Classification Search ...................... 713/1, 713/2, 188, 194, 189; 380/200, 201, 255, 380/277; 726/2; 463/16
See application file for complete search history.

(56) References Cited

U.S. PATENT DOCUMENTS

| | | | |
|---|---|---|---|
| 5,867,824 A | | 2/1999 | Saito et al. |
| 6,633,403 B1 * | | 10/2003 | Nonaka ...................... 358/1.15 |
| 7,027,996 B2 * | | 4/2006 | Levinson ........................ 705/8 |
| 7,237,243 B2 * | | 6/2007 | Sutton et al. ................. 719/310 |
| 2002/0032596 A1 | | 3/2002 | Ohsaki et al. |
| 2002/0069210 A1 * | | 6/2002 | Navani et al. ............. 707/104.1 |
| 2002/0184240 A1 * | | 12/2002 | Volkoff et al. ............... 707/200 |
| 2002/0184518 A1 * | | 12/2002 | Foster et al. ................. 713/200 |
| 2004/0111430 A1 * | | 6/2004 | Hertling et al. ........... 707/104.1 |

FOREIGN PATENT DOCUMENTS

| | | |
|---|---|---|
| JP | A 8-123744 | 5/1996 |
| JP | A-09-152998 | 6/1997 |
| JP | A-2000-138667 | 5/2000 |
| JP | A-2001-251522 | 9/2001 |
| JP | A 2001-282970 | 10/2001 |
| JP | A 2002-99686 | 4/2002 |
| JP | A-2002-366030 | 12/2002 |

* cited by examiner

*Primary Examiner*—Kim Yen Vu
*Assistant Examiner*—Joseph Pan
(74) *Attorney, Agent, or Firm*—Oliff & Berridge, PLC

(57) ABSTRACT

A service providing system passes an instruction form representing an instruction for each server from one server to another to make the server execute its target instruction in the instruction form while protecting confidentiality of the instruction for each server in the instruction form. By combining page dividing (of outputting a file of a predetermined page extracted from a document file having a plurality of pages) provided by a server with e-mail transmission provided by another server, the system implements a cooperative service of extracting a top page from a file of a document entered into an instruction input unit by a user and sending the top page via e-mail to a predetermined destination. The instruction input unit separately encrypts each description about process details for the servers using a public key for the corresponding server, creates instruction forms containing the encrypted descriptions, and sends the instruction forms to the server providing the page dividing service.

6 Claims, 8 Drawing Sheets

INFORMATION PROCESSOR AND INFORMATION PROCESSING METHOD FOR COOPERATIVE OPERATION OF JOB PROCESSOR

BACKGROUND OF THE INVENTION

1. Field of the Invention

The present invention relates to technology for implementing a variety of cooperative processes through cooperative operation of various types of processors residing on a network, and more particularly to security technology in cooperative processes.

2. Description of the Related Art

There is suggested a workflow system, in which devices, such as a scanner, a fax machine, a printer, a copier, and a multifunction machine in which functions of those devices are integrated, are connected to a LAN (Local Area Network) so as to allow the devices to cooperate with an information processor such as a personal computer, and a mail server, for providing various services supporting office work.

Further, technology for making various types of web applications scattered across the Internet cooperate with each other has been suggested in recent years. Because a system configured by linking application services provided by a wide variety of suppliers on the Internet allows a user to utilize a variety of existing services, the widespread expectation is that the system will bring about significant reduction in cost associated with system development. Attention is also being given to languages such as XML (extensible Markup Language) as common ground on which to implement cooperative services.

As a conventional workflow system, those described in Japanese Patent Laid-Open Publication No. Hei 08-123744, No. 2002-099686, and No. 2001-282970 are known.

In the workflow system, it is necessary to transmit instruction data, representing a process to be executed by each processor, to the corresponding processor for implemention of a cooperative service. When a workflow is constructed through the use of a processor provided on the Internet, instruction data directed toward the processor would be transmitted over the Internet. However, in a conventional workflow system, consideration is not given to security of such instruction data transmitted over a network.

On the other hand, as the way in which instruction data is supplied to a plurality of processors which cooperatively operate in the cooperative service, for example, it is considered that the instruction data to be supplied to all the processors is written in a single instruction form and the instruction form is sent to all the processors. In this manner, the instruction data specifically directed toward a certain processor would also be transmitted to other processors. This method provides little problem as long as all the processors reside in a network organized in the same company, while in this method, the instruction data directed toward a processor in a company may be leaked out to an external processor residing on the Internet, which is undesirable in terms of security.

SUMMARY OF THE INVENTION

The present invention provides an information processor which implements a service by cooperatively operating a plurality of job processors each executing its processing according to a process description defined in instruction data, comprises an encryption processor which encrypts the process description defined in the instruction data so as to make the process description representing processing to be carried out by each one of the job processors decryptable for the job processor which executes the process, and a transmitter which sends the instruction data, in which the process description is encrypted by the encryption processor, to the job processor which executes the process described in the encrypted process description.

The information processor may be embodied as an instruction input unit described later in embodiments of this invention, or may be embodied as a flow controller.

According to a preferred embodiment of the present invention, the encryption processor encrypts the process description together with encrypted data on the process description about a downstream process to be carried out later than the process described in the process description being the current encryption target.

Further, the present invention provides an information processor contained in a system which implements a service through cooperative operation of a plurality of job processors in predetermined order, the information processor comprising a receiver which receives instruction data in which the encrypted process description representing a process is contained; a decryption processor which decrypts a part of the process description, which is received by the receiver, representing a process to be executed by the job processor itself; a delete section which deletes the part of the process description decrypted by the decryption processor from the instruction data; and a transmitter which sends the instruction data, from which the decrypted process description is removed by the delete section, to the other job processors-which subsequently execute their processing.

DESCRIPTION OF THE PREFERRED EMBODIMENTS

Referring to drawings, preferred embodiments of the present invention will now be described.

Figure 1:
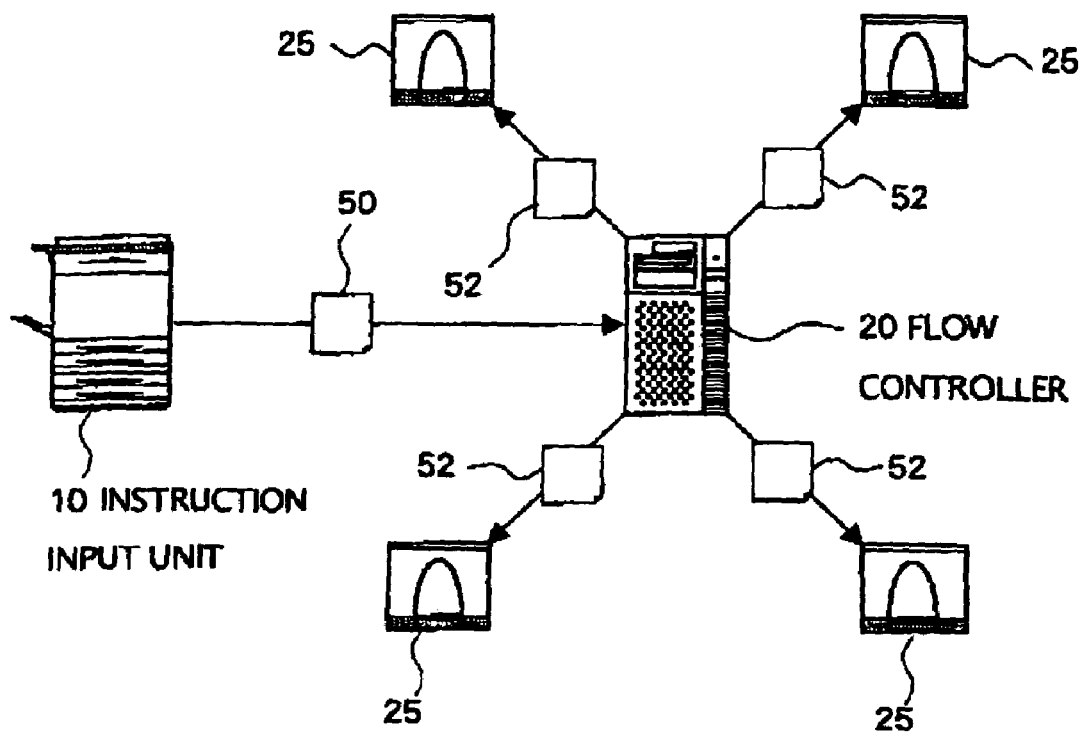
FIG. 1 shows an example of a system configuration which provides a cooperative service.

FIG. 1 shows an example of system configuration patterns of a service providing system according to the present invention. The service providing system includes an instruction input unit 10, flow controller 20, and a plurality of application servers 25.

Each of the application servers 25 provides a specified processing service in response to a request from other devices. The application server 25 may be, for example, a document database server, a mail server, an image processing server for applying operations such as color conversion and rotation to image data. The server 25 provides such a processing service in the form of, for example, a web application service.

The service providing system can provide a cooperative service in which each processing of a plurality of the servers 25 is cooperatively executed like the following: one of the servers 25 in the system searches for a document and another one of the servers 25 sends the obtained document by e-mail.

The instruction input unit 10 is a device used for inputting a process instruction from a user into the system. The user can enter an instruction to execute the cooperative service as described above into the instruction input unit 10 which may be configured by incorporating a user interface program for accepting user input of the instruction to the system into, for example, a personal computer. Considering a document processing service in an office, however, it is preferable to use a digital multifunction machine, having the function of reading a paper document and then transforming the read document into electronic data in addition to an information processing function and a communication function, as the instruction input unit 10. The digital multifunction machine has combined facilities of a scanner, a printer, a copier, a facsimile, network communication, etc.

The flow controller 20 associates the services to be provided by the application servers 25 with each other by asking each of the application servers 25 to execute processing. In this manner, the flow controller 20 implements the cooperative service.

Preferably, the instruction input unit 10, the flow controller 20, and the application servers 25, each having their own private key and public key, support public key cryptography. Further, each of the instruction input unit 10, the flow controller 20, and the servers 25 may possess public keys for the instruction input unit 10, the flow controller 20, and each of the servers 25 as well as their own public key, or may obtain the public keys from a certificate authority on a network, as necessary.

In the system shown in FIG. 1, when a user enters instructions for the cooperative service into the instruction input unit 10, the instruction input unit 10 transmits data on the contents of the instructions (hereinafter referred to as a flow instruction form 50) to the flow controller 20. The flow instruction form 50 includes all descriptions about process details to be executed by the servers 25 involved in the cooperative service and information on each execution sequence of the processes. After receiving the flow instruction form 50, the flow controller 20 controls each of the servers 25 according to the flow instruction form 50 to implement the cooperative service described in the flow instruction form 50.

Then, the flow controller 20 implements cooperative operation of the servers 25 by creating an instruction form (data representing the contents of instruction) 52 directed toward each of the servers 25 according to the received flow instruction form 50, and sending the flow instruction form 52 to each of the servers 25. More specifically, the flow controller 20 sends the instruction form 52 to the servers 25 to be actuated next based on the description of the flow instruction form 50, and after receiving a notice of completion of the processing (and, in some instances, data on a processing result) returned from the servers 25, sends the instruction form 52 to the next servers 25.

Thus, the system shown in FIG. 1 is configured in a so-called star arrangement in which a series of the servers 25 operate in concert with each other under control of the flow controller 20.

Figure 2:
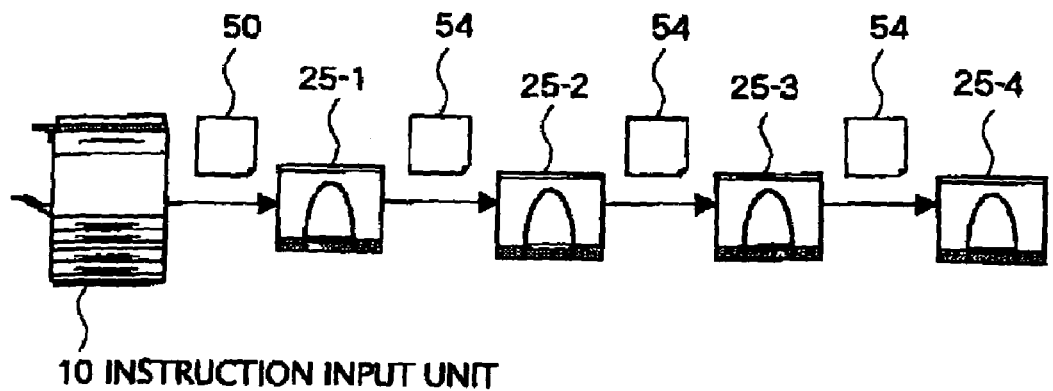
FIG. 2 shows another example of the system configuration which provides the cooperative service.

Referring to FIG. 2, another example of the system configuration patterns of the service providing system according to the present invention will be described. In FIG. 2, components similar to those in the system of FIG. 1 are identified by identical reference numerals to those in FIG. 1 for the sake of simplicity.

The service providing system comprises the instruction input unit 10 and a plurality of the application servers 25.

In contrast to the system of FIG. 1 including the flow controller 20 for controlling cooperative operation, the service providing system shown in FIG. 2 does not include such a central controller and each of the application servers 25 carries out the control for the cooperative operation internally. Accordingly, the instruction input unit 10 creates the flow instruction form 50 in which each process to be executed by the servers 25 for the cooperative service indicated by the user is described, and transmits the created flow instruction form 50 to the servers 25, to thereby allow each of the servers 25 to carry out the corresponding process described in the flow instruction form 50.

The configuration shown in FIG. 2 is a so-called daisy chain arrangement in which the servers 25, each executing a process associated with the cooperative service, are arranged in the order of processing. In this configuration, the instruction input unit 10 transmits the flow instruction form 50 to a first server 25-1 in the server chain, which triggers the first server 25-1 to execute its processing for the service. Then, when the server 25-1 completes the processing, a subsequent server 25-2 is initiated to execute processing, and when the server 25-2 completes the processing, a further subsequent server 25-3 is initiated to execute processing. In this manner, processing is cooperatively executed by each of the servers 25 in various steps. In this case, the instruction form 54 is sent directly from the instruction input unit 10 or from one of the servers 25 in the previous stage to each of the servers 25. Each of the servers 25 executes processing according to the instruction form 54, and transmits an instruction of processing start or the instruction form 54 to the subsequent server 25 specified in the instruction form. With this construction, cooperative operation is carried out (details will be explained later).

Two types of construction, one of which is flow controller involvement type in which centralized control is executed by the flow controller 20, and the another one of which is flow controller non-involvement type in which each processing is sequentially passed from the servers 25 to the subsequent servers 25, have been described.

Regarding the instruction forms 52, 54 sent to each of the servers 25 for the cooperative service, two different modes will be described below.

In a first mode, the instruction form 52 or the instruction form 54 including not only instructions directed toward the servers 25 (a description of a process detail to be executed by the servers 25) but also instructions directed toward the reminder of the severs 25 is transmitted. One example of the first mode is such that an instruction form including the entire instructions directed toward all the servers 25 involved in the cooperative service is sent to each of the servers 25. Such an instruction form containing instructions directed toward the other servers 25 will be referred to as "a comprehensive instruction form".

In a second mode, the instruction form 52 or the instruction form 54 including instructions for only one server 25 and not including instructions for the other servers 25 is sent to each of the servers involved in the cooperative service. Such an instruction form containing no instruction for the other servers 25 will be referred to as "an individual instruction form".

By combining the two modes of instruction forms 52 and 54 with the two types of above-described system configurations, several configurations for sending the instruction form to each of the servers can be obtained. As representative examples, the following four instruction sending configurations can be given.

Figure 3:
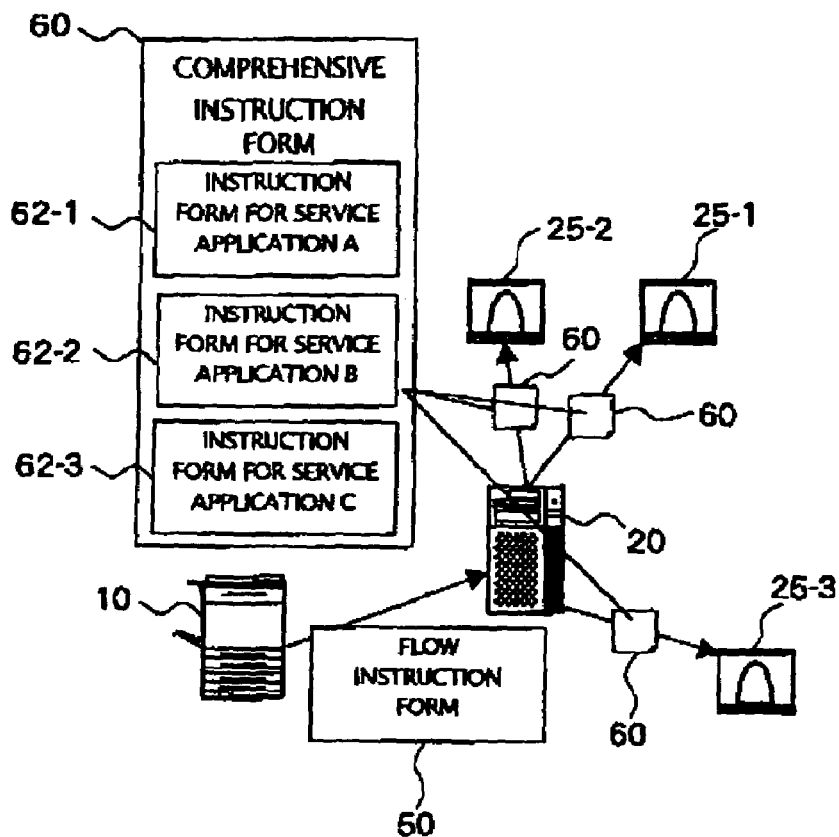
FIG. 3 shows an example of a configuration for sending instruction forms to servers in the cooperative service.

A first instruction sending configuration is a scheme, in which the comprehensive instruction form is applied to the flow controller involvement system, achieved by transmitting the comprehensive instruction form 60 from the flow controller 20 to each of the servers 25. FIG. 3 shows a sample of the first instruction sending configuration.

In the sample configuration of FIG. 3, the flow controller 20 sends the comprehensive instruction form 60 containing an individual instruction form 62-1 representing the contents of instruction directed toward the server 25-1, an individual instruction form 62-2 representing the contents of instruction directed toward the server 25-2, and an individual instruction form 62-3 representing the contents of instruction directed toward the server 25-3 to each of the servers 25-1, 25-2, and 25-3. In the comprehensive instruction form 60, the individual instruction forms 62 are given according to a process execution sequence from the top to the bottom. The comprehensive instruction form 60 is created based on a description in the flow instruction form 50 which is sent from the instruction input unit 10 to the flow controller 20. The flow instruction form 50 may have a description equal to that of the comprehensive instruction form 60, for example.

In this configuration, the flow controller 20 first sends the comprehensive instruction form 60 to the server 25-1 which is a first server in the cooperative service. The server 25-1 interprets the individual instruction form 62-1 directed toward the server 25-1 itself, executes the process described therein, and returns processed results to the flow controller 20. Then, the flow controller 20 receiving the processed results sends the comprehensive instruction form 60 to the subsequent server 25-2. By repeating such processing in this manner, the cooperative service can be implemented.

As a modification of this configuration, it is also preferable to remove the description regarding a process completed at the time of transmission from the comprehensive form 60 to be sent from the controller 20 to each of the servers 25. In this configuration, at least the process detail of the servers 25 which completed its processing can be concealed from the remaining downstream servers 25.

As another modification of the instruction sending configuration shown in FIG. 3, the following scheme can be accepted. In this scheme, the flow controller 20 sends the comprehensive instruction form 60 containing all the individual instruction forms 62 directed to the servers 25 involved in the cooperative service to the servers 25. Each of the servers 25 does not initiate its processing until receiving the instruction of processing start from the preceding servers 25, and executes processing according to the corresponding individual instruction forms 62 contained in the comprehensive instruction form 60 after receiving the instruction of processing start, and upon the completion of processing, provides notification of completion of processing to the flow controller 20. After receiving the notification, the flow controller 20 issues the instruction of processing start to the subsequent servers.

A second instruction sending configuration is a scheme, in which the individual instruction forms are applied to the flow controller involvement system, where the flow controller 20 individually sends the corresponding individual instruction forms 62 to each of the servers 25. A sample of this configuration is shown in FIG. 4.

Figure 4:
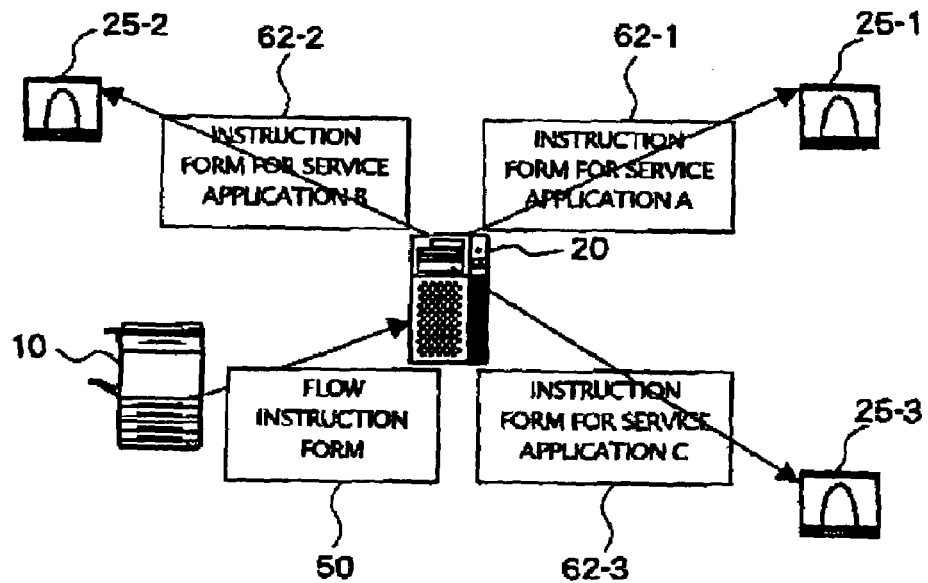
FIG. 4 shows another example of the configuration for sending instruction forms to the servers in the cooperative service.

In the sample configuration of FIG. 4, the flow controller 20 produces the individual instruction form 62-1 describing the contents of instruction directed toward the server 25-1, the individual instruction form 62-2 describing the contents of instruction directed toward the server 25-2, and the individual instruction form 62-3 describing the contents of instruction directed toward the server 25-3, based on the flow instruction form received from the instruction input unit 10, and individually sends each of the individual instruction forms 62 to the corresponding servers 25.

A third instruction sending configuration is a scheme in which the comprehensive instruction form is applied to the flow controller non-involvement system. An example of the third configuration is shown in FIG. 5.

Figure 5:
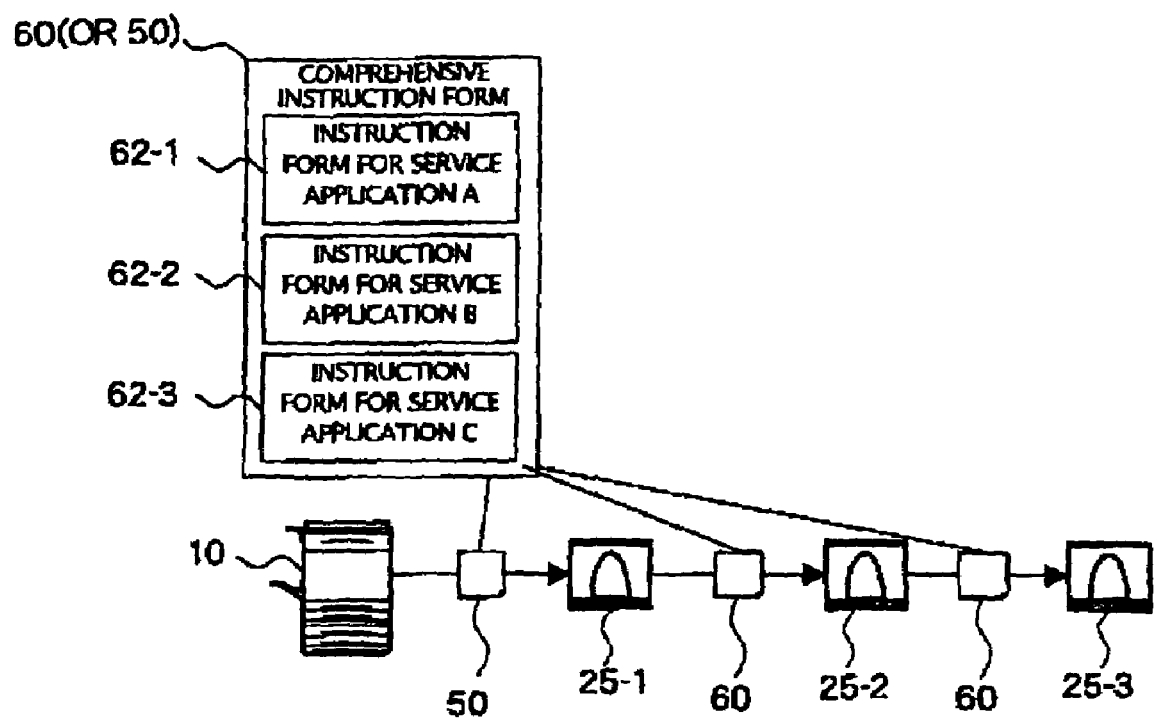
FIG. 5 shows still another example of the configuration for sending instruction forms to the servers in the cooperative service.

In the configuration example of FIG. 5, the comprehensive instruction form 60 similar to that of the second configuration shown in FIG. 3 is passed from the server 25-1 to the server 25-2 and passed from the server 25-2 to the server 25-3. More specifically, in the example of FIG. 5, the instruction input unit 10 sends the flow instruction form having the contents identical to that of the comprehensive instruction form 60 to the server 25-1. The server 25-1 executes the process described in the individual instruction form 62-1 directed toward the server 25-1 itself in the comprehensive instruction form 60, and after completing the process, transmits the same comprehensive instruction form 60 (and processed results as necessary) to the subsequent server 25-2. After receiving the comprehensive instruction form 60, the server 25-2 executes the process described in the individual instruction form 62-2 directed toward the server 25-2 itself, and after completing the process, transmits the same comprehensive instruction form 60 (and processed results as necessary) to the subsequent server 25-3. In this manner, cooperation of the processes is achieved by each of the servers 25.

As a modification of the instruction sending configuration shown in FIG. 5, it is also preferable that, after the completion of processing, each of the servers 25 removes the description representing the completed process (i.e. one of the individual instruction forms 62 directed toward the server 25 itself) from the comprehensive instruction form 60, and creates a new comprehensive instruction form consisting of the remaining individual instruction forms 62, and then sends the new comprehensive instruction form to the subsequent server 25. In this configuration, at least the process detail executed by the servers 25 can be concealed from the remaining downstream servers 25.

As another modification of the instruction sending configuration of FIG. 5, the following scheme can be accepted. In this scheme, the instruction input unit 10 sends the comprehensive instruction form 60 containing all the individual instruction forms 62 directed toward the servers 25 involved in the cooperative service to the servers 25. Then, each of the servers 25 does not initiate its processing until receiving the instruction of processing start from the preceding servers 25, and executes processing according to the corresponding individual instruction forms 62 directed toward the server 25 itself contained in the comprehensive instruction form 60 after receiving the instruction of processing start, and then issues the instruction of processing start to the subsequent servers 25 after completing its processing. In the comprehensive instruction form 60, because the individual instruction forms 62 for the servers 25 are arranged in the processing order, each of the servers 25 can identify the preceding and the subsequent servers 25 from the description in the previous and the following individual instruction forms 62, which makes it possible to realize the above-described process flow.

A fourth instruction sending configuration is a scheme in which the individual instruction forms are applied to the flow controller non-involvement system. An example of this scheme is shown in FIG. 6.

Figure 6:
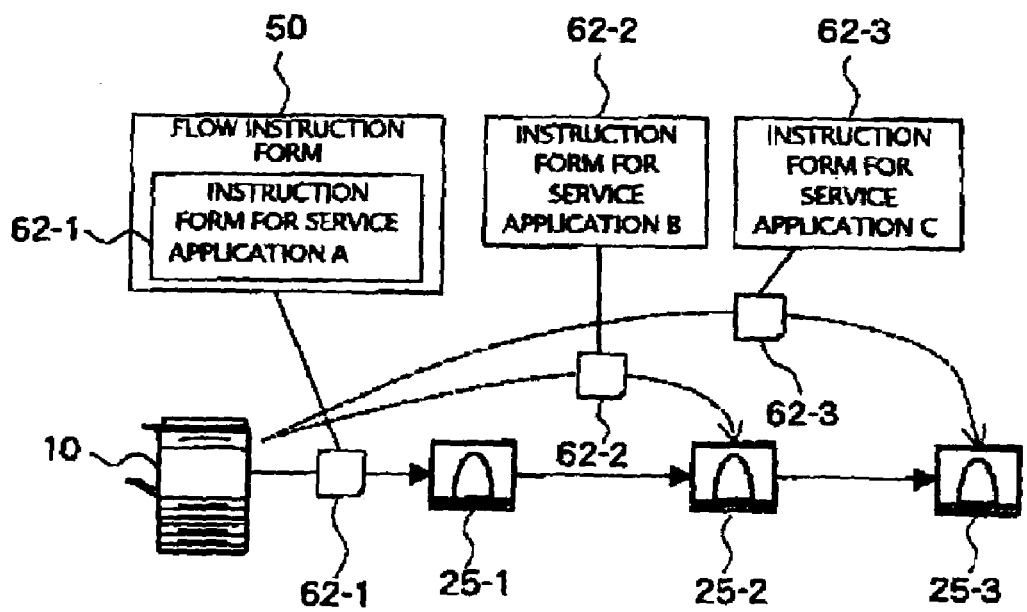
FIG. 6 shows yet another example of the configuration for sending instruction forms to the servers in the cooperative service.

In the configuration example of FIG. 6, the instruction input unit 10 sends the individual instruction forms 62-1, 62-2, and 62-3, each directed toward the corresponding servers 25-1, 25-2, and 25-3 involved in the cooperative service to the servers 25-1, 25-2, and 25-3, individually. Further, the individual instruction forms 62 each directed toward corresponding servers 25 contain information on the preceding and subsequent servers 25 (or the instruction input unit 10). Then, each of the servers 25 initiates its processing described in the corresponding individual instruction form 62 only after receiving the instruction of processing start from the preceding server 25, and sends the instruction of processing start to the subsequent server 25 after completing the processing. With this configuration, cooperation of the servers 25 can be achieved.

Among the above-described instruction sending configurations, the second and the fourth configurations, in which the individual instruction forms 62 are sent to the servers 25, are vulnerable to tapping of the individual instruction forms 62 on a network such as the Internet.

On the other hand, the first and the third configurations, in which the comprehensive instruction form 60 is sent to the servers 25, are at risk of the contents of instruction directed toward one of the servers 25 being leaked out to the other servers 25 in addition to the danger of tapping on the network. When a company uses an external server 25 provided by another company on the Internet as well as using its own servers 25, for example, it is very likely that the company does not want to reveal the contents of instruction directed toward its own servers 25 to the external server provided by another company.

Now, a mechanism for reducing the risk in terms of security associated with the instruction forms to be sent to the servers 25 will be described.

The basic concept of the mechanism is to encrypt the individual instruction form directed toward the servers 25 with encryption only decryptable for the directed servers 25 in a series of the servers involved in the cooperative service.

In the second and the fourth instruction sending configurations in which only the corresponding individual instruction form 62 is sent to each of the servers 25, by the above encryption, the risk of leakage of the contents of instruction on the network can be reduced.

On the other hand, in the first and the third configurations in which the comprehensive instruction form 60 is sent to the servers 25, each of the individual instruction forms 62 to be inserted into the comprehensive instruction form 60 is encrypted by encryption decryptable only for the corresponding servers 25, and the comprehensive instruction form 60 in which the encrypted individual instruction forms are given is created according to the process execution sequence. In this manner, the risk of tapping of the contents of the individual instruction form 62, which are directed to each of the servers 25, on the network can be reduced, and the risk of the contents directed toward the specific server 25 being leaked to the remaining other servers 25 can be reduced as well.

In either case, as encryption of the individual instruction forms 60, encryption using secret key cryptography and encryption using public key cryptography may be adopted. When the secret key cryptography is used, both the flow controller 20 or the instruction input unit 10, which creates the individual instruction forms 62 each directed toward the servers 25, and the directed server 25, to which the corresponding individual instruction form 62 is transmitted, can possess a common secret key for encryption/decryption. On the other hand, when the public key cryptography is used, the flow controller 20 or the instruction input unit 10, which creates the individual instruction forms 62 each directed toward the servers 25, may possess public keys for the servers 25, or may have the function of obtaining the public keys from a key administration server or certificate authority on a network. Alternatively, it is also acceptable that after generating a session key (secret key) used for encrypting the individual instruction form 62 from random numbers, the individual instruction form 62 is encrypted using the generated session key, and the session key used for encryption is also encrypted using the public key for the destination server 25, and then the encrypted session key is transmitted with the encrypted individual instruction form 62.

It should be noted that in the first and the second instruction sending configuration using the flow controller 20, it is necessary to send the flow instruction form 50 to the flow controller 20 from the instruction input unit 10 at the time of starting processing. In order to send the flow instruction form 50, the instruction input unit 10 encrypts the flow instruction form 50 using encryption decryptable only for the flow controller 20 (for example, encryption using the public key for the flow controller 20), and then transmits the resulting encrypted instruction form to the flow controller 20. The flow controller 20 decrypts the received instruction form and creates the individual instruction forms 62 each directed toward one of the servers 25 (in the second and the fourth configurations) or creates the comprehensive instruction form 60 (in the first or the third configurations) based on the decryption result.

Next, using a specific example of the cooperative service, encryption of the instruction form according to this embodiment will be described.

Figure 7:
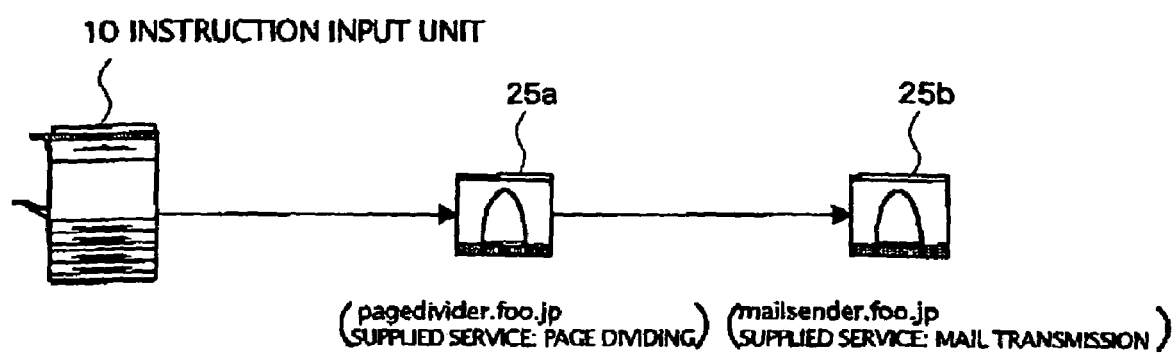
FIG. 7 is a diagram showing an example of a system configuration implementing a cooperative service of extracting only a top page from a document file obtained by reading out a paper document, and sending the extracted top page attached to an e-mail message to a predetermined destination.

Here, as the specific example, a system comprising a server 25a, which provides a page dividing service (in which a document file is divided by page into a plurality of files, and a file of a requested page is returned), and a server 25b, which provides an e-mail sending service, as shown in FIG. 7, is assumed. The server 25a is assumed to have a host name of "pagedivider.foo.jp" and the server 25b is assumed to have a host name of "mailsender.foo.jp". It is further assumed to implement a service such that data on a first page of a paper document consisting of a plurality of pages read by the instruction input unit 10 is sent to a specified destination via e-mail (hereinafter referred to as "service A" for the sake of convenience). In the service A, the instruction input unit 10 reads out the paper document, and the server 25a extracts the first page of a document file created as the result of reading, and then the server 25b creates an e-mail message containing the file of the extracted first page and transmits the file to the specified destination. It should be noted that in this example, the third configuration shown in FIG. 5 is used as an instruction sending configuration.

Figure 8:
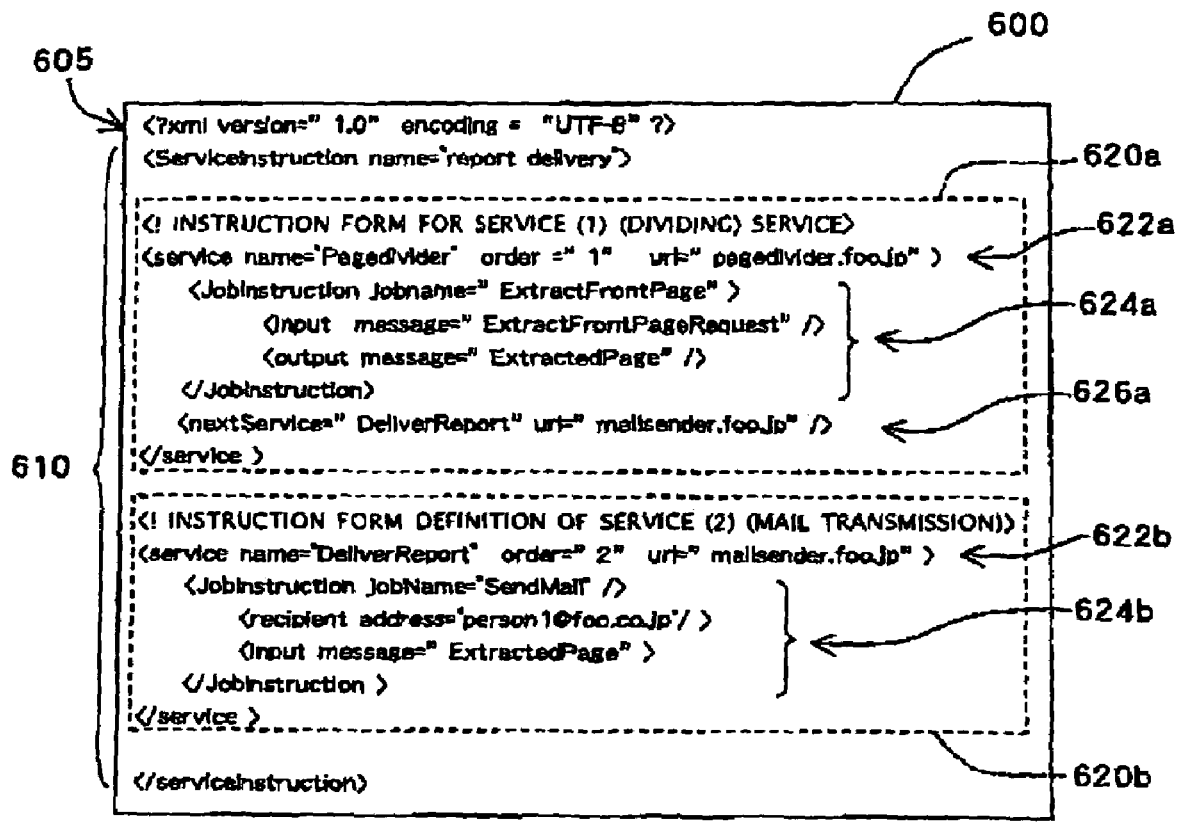
FIG. 8 shows an example of a comprehensive instruction form written in clear text which is initially prepared by an instruction input unit in FIG. 7.

The instruction input unit 10 produces a comprehensive instruction form 600 representing detail about the service A. FIG. 8 shows an example of the comprehensive instruction form 600.

The comprehensive instruction form 600 of this example is written in XML (extended Markup Language) and contains a document element 605, representing a version of XML and character code used in the instruction form 600, and a document element 610 representing the cooperative service described in the instruction form 600. Designation of the cooperative service (name="report delivery") is indicated in a tag f the document element 610 representing the cooperative service. The document element 610 includes individual instruction forms 620a and 620b directed toward the servers 25a and 25b supporting the cooperative service, respectively.

A description 622a in the individual instruction form 620a shows the order of a pertinent process in the cooperative service (order="1") and a hostname (url="pagedivider.foo.jp") of the server 25a which executes the pertinent process. On the other hand, the first line in a description 624a shows designation of the process (jobname="ExtractFrontPage") which is specified for this service from a variety of processes provided by the server 25a. For example, in addition to extracting a first page from a document file and creating a file for the first page, the server 25a is capable of executing various types of processes such as dividing a document file by page to create files on a page-by-page basis. The first line of the description 624a specifically indicates the process of creating a file of the first page in the document file from the various kinds of processes. Further, the second and the third lines of the description 624a show parameters for the process. The parameter on the second line is a filename of an input file for this process ("ExtractFrontPage) and the parameter on the third line is a filename of an output file for this process ("ExtractedPage"). By assigning the filename "ExtractFrontPage" to the document file representing the document read by the instruction input unit 10 and sending the instruction form 600 attached with the document file to the server 25a from the instruction input unit 10, the server 25a can recognize the document file as a target object of the process.

The individual instruction form 620a further includes a description 626a indicating the subsequent server 25b which executes its processing after the process described in the individual instruction form 620a is completed. The description 626a shows a hostname of the subsequent server 25b (url="pagedivider.foo.jp").

An individual instruction form 620b directed toward the server 25b contains, similarly to the above-described individual instruction form 620a, the description 622b, representing the order of a pertinent process and a hostname of the server 25b, and the description 624b showing designation of the process to be carried out by the server 25b and parameters for the process. As the process to be carried out by the server 25b is to send an e-mail message, the parameters include a destination address of the e-mail message (shown on the second line of the description 624b) and a filename to be attached to the e-mail message (shown on the third line of the description 624b). It should be noted that the filename given to the file to be attached is identical to the name of the output file for the process executed by the server 25a.

Because the process executed by the server 25b is the last process for the cooperative service defined in the comprehensive instruction form 600, the description about a subsequent server is not contained in the individual instruction form 620b.

In the comprehensive instruction form 600 shown in FIG. 8, the descriptions 624a and 624b, indicating process details in the individual instruction forms 620a and 620b, respectively, are written in clear text, which allows the first server 25a to know the process detail to be executed by the second server 25b as well as posing a risk of tapping it the comprehensive instruction form 600 is transmitted on a network without taking any measures. For example, when an ID number of a user's credit card or the like is contained in the description about the process detail as a parameter, it is undesirable for data on the ID number to be revealed to any server other than the server pertinent to the data. In some instances, it is desirable to conceal every part of the process details from the servers other than the pertinent server.

Figure 9:
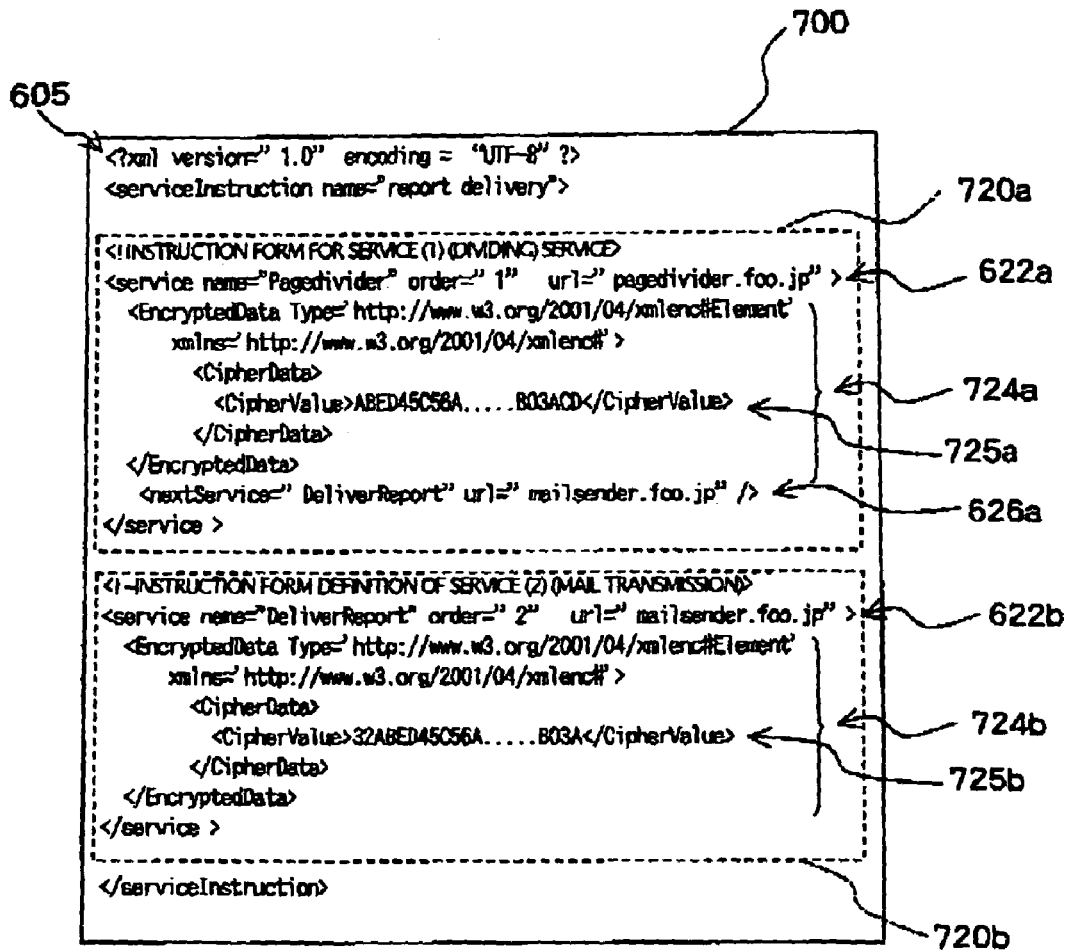
FIG. 9 is a diagram showing a result of encrypting each segment of instruction contained in the comprehensive instruction form in clear text shown in FIG. 8 through the use of a public key for a server which executes the instruction described in the segment.

Accordingly, in the example of FIG. 7, the instruction input unit 10 encrypts the descriptions 624a, 624b, which represent the process details, contained in the individual instruction forms 620a, 620b constituting the comprehensive instruction form 600 through the use of the public keys for the corresponding servers 25a, 25b. FIG. 9 shows a sample of the comprehensive instruction form obtained by such encryption as described above. In FIG. 9, the description representing the process detail similar to those in FIG. 8 is identified by reference characters equal to those of FIG. 8 for the sake of simplification.

A comprehensive instruction form 700 shown in FIG. 9 is pursuant to "XML Encryption" specified in the W3C standard. In the comprehensive instruction form 720, an individual instruction form 720a contains the description 622a representing the order of the process and the hostname of the server 25b, the description 626a indicating the server 25b which subsequently executes its processing, and an encrypted segment 724a. The encrypted segment 724a includes data in which the description 624a representing the process detail written in clear text in the individual instruction form 620a is encrypted using the public key for the server 25a. A string in ASCII code enclosed between tags of "<CipherValue>" and "<CipherValue>" indicates values of the encrypted data. In a first tag of the encrypted segment 724a, information on an encryption scheme used for generating the encrypted data ("Type='http://www.w3.org/2001/04/xmlenc#Element' xmlns='http://www.w3.org/2001/04/xmlenc#'") is described. It should be noted that in order to simplify explanation, a summary of key information ("<Keyinfo>") designating the public key used for generating the encrypted data, which should be contained in the encrypted segment 724a, is not shown in FIG. 9.

Similarly, an individual instruction form 720b directed toward the server 25b contains the description 622b, representing the order of the process and the hostname of the server 25b, and an encrypted segment 724b including a description 725b representing data in which the description 624b of the process detail is encrypted using the public key for the server 25b.

When the comprehensive instruction form 700 shown in FIG. 9 is used, the process detail to be executed by each of the servers 25a and 25b is not revealed unless the encrypted data on the process detail is cracked, even if the comprehensive instruction form 700 is intercepted. Further, after receiving the comprehensive instruction form 700, the server 25a can decrypt the encrypted segment 724a in the individual instruction form specifically directed toward the server 25a itself and the server 25b can decrypt the encrypted segment 724b specifically directed toward the server 25b itself, yet they are incapable of decrypting the encrypted segment in any other individual instruction forms directed toward other servers.

In the system shown in FIG. 7, the instruction input unit 10 creates the above-described comprehensive instruction form 700, and sends the document file of the document read out by its attachment scanner together with the created comprehensive instruction form 700 to the server 25*a*. After receiving data on the document file and the instruction form, the server 25*a* identifies the individual instruction form 620*a* directed toward the server 25*a* itself by checking the descriptions 622*a* and 622*b* indicating the order of the process and the host name written in clear text in the comprehensive instruction form 700. Then, the server 25*a* decrypts the encrypted segment 724*a* contained in the individual instruction form 620*a* using its own private key. Decrypted results are the description 624*a* about the process detail shown in FIG. 8. By replacing the encrypted segment 724*a* with the description 624*a* of the decrypted results, the server 25*a* restores the individual instruction form 620*a* in clear text, and sequentially interprets the instruction form 620*a* from the top to the bottom, and then executes the process based on interpreted results. In this example, the server 25*a* executes processes of extracting the first page of the input document file and allocating the predetermined filename "ExtractedPage" to the file containing the first page. After completing the requested processes for the service as described above, the server 25*a* sends the created file of the first page and the comprehensive instruction form 700 to the subsequent server 25*b* according to the description 626*a*.

The server 25*b* identifies, similarly to the server 25*a*, the individual instruction form 720*b* directed toward the server 25*b* itself from the received comprehensive instruction from 700, and restores the individual instruction form 620*a* in clear text by decrypting the encrypted segment 724*b* contained in the identified instruction form 720*b* using its own private key, and then executes the process described in the instruction form 620*b* in clear text. In this case, the server 25*b* creates an e-mail message attached with the file of the first page designated as "ExtractedPage", and sends the e-mail message to a destination (person1@foo.co.jp) specified in the individual instruction form 620*b* in clear text.

Although a very simple example is described in the above for the sake of simplified explanation, the mechanism of this embodiment is applicable to more complicated processes. As an expanded version of the above example, for example, a routine process of sending a first page of a document read out by a user to a leader of a group to which the user belongs and sending all pages of the document to several other members of the group can be realized in an analogous fashion. In the expanded example, a process detail for extracting the first page from the document file and sending the file containing the first page and the entire document file to the server 25*b* is described in the individual instruction form 620*a* to be directed toward the server 25*a*, and a process detail for sending the received file containing the first page to a predetermined e-mail address of the group leader as well as sending the file containing the whole pages to predetermined e-mail addresses of the several other members is described in the individual instruction form 620*b* to be directed toward the server 25*b*. Encryption may be carried out similarly to the above example.

with the mechanism as described above, the possibility of danger such as the process details in the individual instruction forms 620*a* and 620*b* being intercepted by a third party, or leaked to servers other than the pertinent server which carries out the process can be reduced significantly.

Further, in the above-described system, by having the instruction input unit 10 encrypt document data which is a target object of the server 25*a* with the public key for the server 25*a* and then sending the encrypted document data to the server 25*a*, or having the server 25*a* encrypt data on the first page which is a target object of the server 25*b* using the public key for the server 25*b*, data being the target object can be protected from a third party on a network.

Although the description 624*a* about the process detail in each of the individual instruction forms is encrypted in the above-described example of FIG. 9, it is also possible to additionally encrypt the description 626*a* directed toward the subsequent server as well. Regarding the individual instruction form, as long as information necessary for identifying the destination server of the individual instruction form is written in clear text, any other items of information may be encrypted.

The server 25*a* may be configured as follows. By removing the individual instruction form 720*b* specifically directed toward the server 25*a* itself from the comprehensive instruction form 700, the server 25*a* may create a new instruction form and send the new instruction form to the subsequent server 25*b* instead of sending the comprehensive instruction form 700.

In the examples shown in FIGS. 7-9, the third configuration depicted in FIG. 5 is used as the instruction sending configuration, whereas in the case of using the first configuration depicted in FIG. 3, the encrypted comprehensive instruction form 700 as shown in FIG. 9 may be sent to each of the servers 25 as is the case with the third configuration. In the case of the third configuration, however, the flow controller. 20 may carry out encryption of each of the individual instruction forms. For encryption at the flow controller 20, the instruction input unit 10 encrypts all the document elements 610 representing the cooperative service in the comprehensive instruction form 600 using the public key for the flow controller 20 and sends the encrypted one to the flow controller 20, to thereby maintain the secrecy of the comprehensive instruction form 600 as a whole. Then, the flow controller 20 decrypts the received encrypted comprehensive instruction form 600 using its own private key, and then creates the comprehensive instruction form 700 by encrypting each of the individual instruction forms 620*a*, 620*b* using the corresponding public keys for the servers 25*a*, 25*b*, respectively. Control of each of the servers 25 using the comprehensive instruction form 700 may be executed as described above.

On the other hand, when the second instruction sending configuration illustrated in FIG. 4 is used, because only a corresponding one of the individual instruction forms is sent to each of the servers 25, the flow controller 20 may encrypt the description about the process detail, etc. in each of the individual instruction forms using the corresponding public key for the destination server 25. The description in the individual instruction form generated based on this encryption may be that obtained by reconfiguring the comprehensive instruction form 700 illustrated in FIG. 9 so as to contain the only one individual instruction form 720*a*.

Also in a case where the fourth instruction sending configuration is used, because only one of the individual instruction forms is sent to each of the servers 25, the description about the process detail, etc. in each of the individual instruction forms may be encrypted using the corresponding public key for the destination server 25 by the instruction input unit 10 similarly to the second configuration.

Up to this point, security schemes of instruction form data in accordance with the instruction sending configurations in this embodiment have been described.

A modified example of the comprehensive instruction form 60 in FIG. 3 will be described below. The modified example of the comprehensive instruction form is particularly useful in the third instruction sending configuration.

Figure 10:
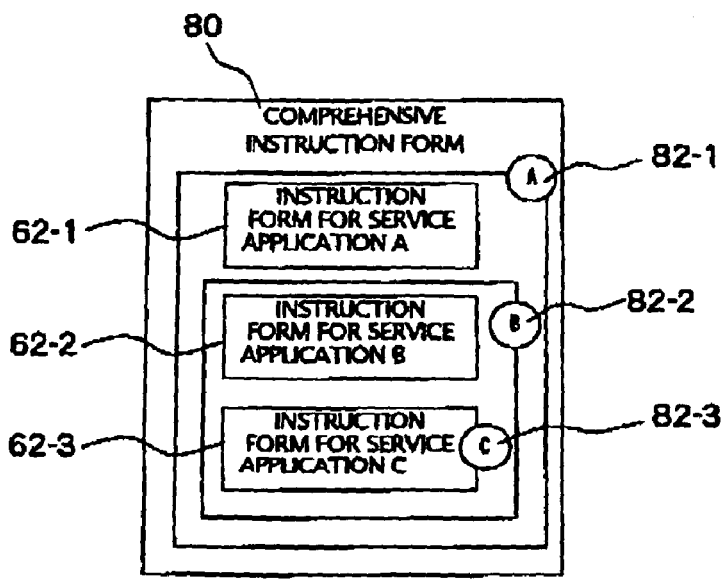
FIG. 10 is a schematic diagram showing a structure of the comprehensive instruction form encrypted in a nested structure.

FIG. 10 is a diagram for explaining the data structure of a comprehensive instruction form 80 in the modified example. For the system configuration to which the comprehensive instruction form 80 is applied, refer to FIG. 5.

In the comprehensive instruction form 80, the individual instruction forms 62-1, 62-2, and 62-3 directed toward the servers 25-1, 25-2, and 25-3 which execute the processes for the cooperative service, respectively, are encrypted so as to have a nested structure in which the individual instruction forms 62-1, 62-2, and 62-3 are nested according to the execution sequence of the processes.

More specifically, the individual instruction form 62-3 directed toward the server 25-3 which is the last server in a cooperative service flow is encrypted using the public key for the server 25-3 to create encrypted data 82-3. In this encryption segments of the description other than a segment representing a server which executes the process described in the individual instruction form 62-3 (for example, the description 622a shown in FIG. 8) are encrypted in the individual instruction form 62-3. However, the number of the segments of the description to be the encryption target may be reduced further.

Next, the individual instruction form 62-2 directed toward the server 25-2, which is a preceding server to the last server 25-3, is encrypted together with the encrypted data 82-3 directed toward the last server 25-3 using the public key for the server 25-2, to create encrypted data 82-2.

Then, the individual instruction form 62-1 directed toward the server 25-1, which is a further preceding server, is encrypted together with the encrypted data 82-2 using the public key for the server 25-1 to create encrypted data 82-1.

Such processing is recursively repeated until the individual instruction form to the leading server in the cooperative service flow is encrypted. That is, in this encryption, previously encrypted data on the description about processing (i.e. the individual instruction forms) to be carried out in downstream processes subsequent to the processing described in the description of the current encryption target is also included in the current encryption target. This encryption is recursively applied to the description about the processes from the last process in the execution sequence.

Because the server 25-1 is the leading server in the example of FIG. 10, the encrypted data 82-1 becomes the final result of this encryption. After adding a segment of description specifying that it is an instruction form for the cooperative service (i.e. the description 605 shown in FIG. 8, and start-tag and end-tag of the document element 601) to the final encrypted data 82-1, the comprehensive instruction form 80 will be complete.

Figure 11:
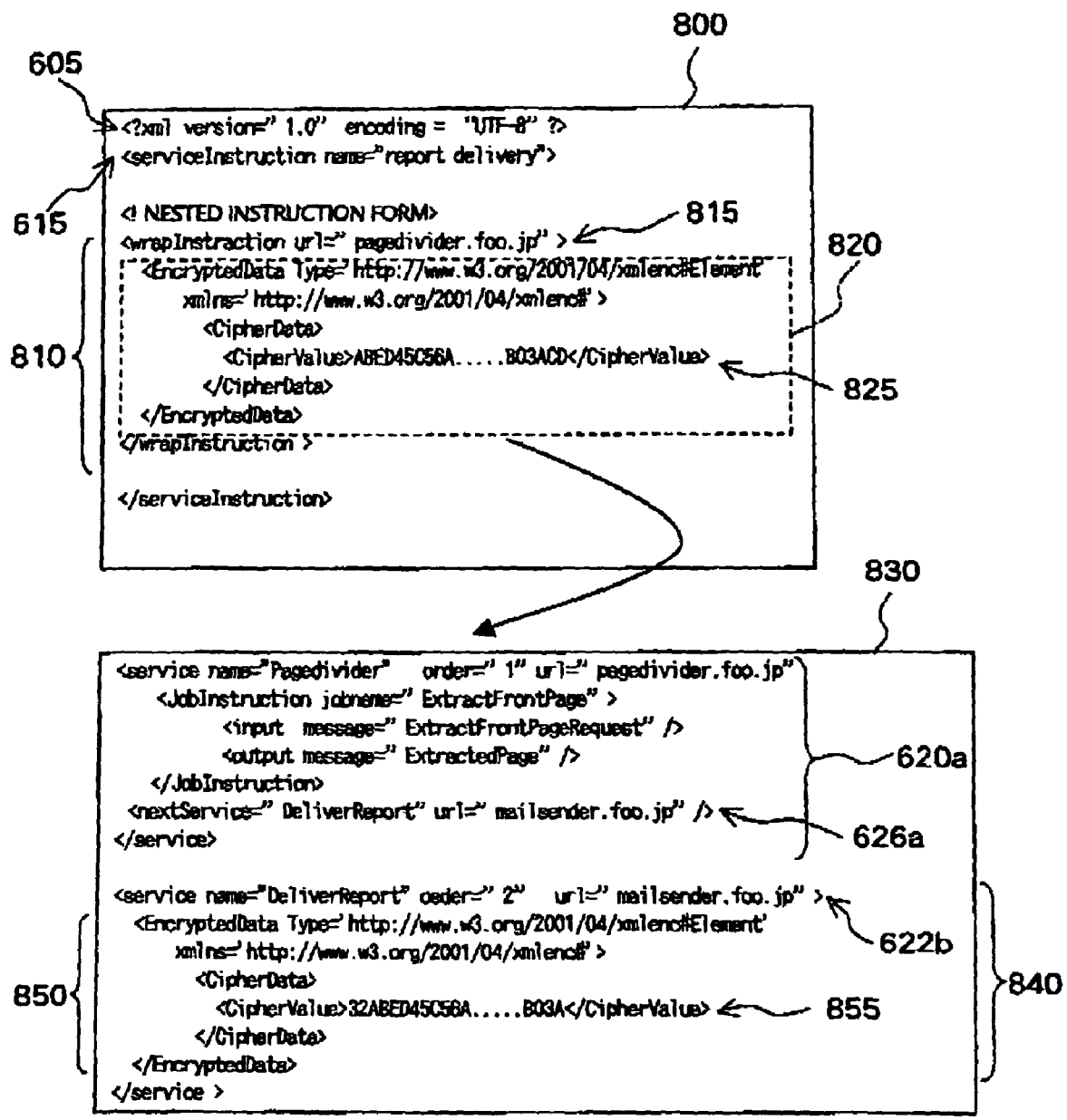
FIG. 11 shows an example of the comprehensive instruction form encrypted in the nested structure.

A specific example of the comprehensive instruction form in the nested structure is shown in FIG. 11. This example corresponds to the comprehensive instruction form 600 of FIG. 8 written in clear text. For the system configuration to which this instruction form is applied, refer to the configuration in FIG. 7.

The comprehensive instruction form illustrated in FIG. 11 contains the description 605 regarding the version of XML, etc. and the description 615 indicating the designation of the cooperative service prior to the document element 810 containing the encrypted data 820 encrypted in the nested structure. At the top of the document element 810, a tag 815 containing the hostname of the leading server 25a in the cooperative service is represented. The encrypted data 820 contains a segment of the description about the encryption scheme used and the description 825 of values of the final encryption result of encryption in the nested structure.

The instruction input unit 10 creates the comprehensive instruction form 800 as described above and sends it to the server 25a of the leading server in the cooperative service. The server 25a receiving the comprehensive instruction form 800 recognizes the comprehensive instruction form 800 as being directed toward the server 25a itself from the hostname in the "<wrapinstruction>" tag 815 written in clear text, and then decrypts the values of the encrypted results represented by the description 825 in the instruction form 800 with its own private key. In this manner, decrypted results 830 are obtained.

The decrypted results 830 contain the individual instruction form 620a, written in clear text and directed toward the server 25a, and a document element 840 including encrypted data 850 in the nested structure for a series of subsequent servers 25.

The server 25a executes its processing according to the individual instruction form 620a written in clear text, and after completing the processing, creates an instruction form for the subsequent server 25b represented in the description 622a, and then sends the created instruction form to the server 25b together with the processed results. Creation of the instruction form for the server 25b can be achieved by removing the instruction form 620a directed toward the server 25a itself from the decrypted results 830. In other words, the created instruction form includes the descriptions 605 and 615 representing that it is the instruction form and the document element 840 including the encrypted data 850.

The server 25b receiving the instruction form created by the server 25a recognizes that the received instruction form is directed toward the server 25b itself from the description 622b for the hostname contained in the document element 840, and decipher the values of the encryption results contained in the description 855 using its own private key. With the above procedures, a clear text description corresponding to the description 624b about the process detail (refer to FIG. 8) in the instruction form of FIG. 7 can be obtained. Then, the server 25b executes the process according to the description 624b.

Because the server 25b is the last server in the cooperative service in the example of FIG. 11, the document element 840 is represented as a document element starting with a "<service>" tag. If the server 25b subsequent to the server 25a were not the last server in the cooperative service, the document element 840 would be represented using the "<wrapinstruction>" tag similarly to the document element 810 in the initial comprehensive instruction form 800 instead. It should be noted that, regarding the individual instruction form directed to the last server, the entire instruction form may be encrypted and the results of encryption may be enclosed between "<wrapinstruction>" tag and "</wrapinstruction>" tag.

With a configuration such that the instruction input unit 10 creates the comprehensive instruction form 800 in the nested structure as described above, the individual instruction form directed toward a certain server cannot be decrypted in the cooperative service flow unless all decryption processes that are supposed to be carried out by the servers preceding the certain server are completed in orderly sequence by all the preceding servers. Therefore, if a server X, which is associated with the cooperative service but not the leading server, receives the comprehensive instruction form from a server other than the server immediately preceding the server X, the server X can not initiate its processing because the server X is not capable of decrypting the received comprehensive instruction form.

Through the use of such a mechanism, the server X arbitrarily starting its processing without going through the processes pursuant to the proper flow of the cooperative service can be avoided. In a case where the server X executes a process associated with billing, for example, in a cooperative service it is undesirable, for a user who requested the cooperative service, for the server X to initiate its processing in advance without following the proper processing flow and start the billing process. However, such improper initiation of the process can be prohibited by using the comprehensive instruction form 800 in the nested structure.

Up to this point, configurations and operation of the service providing system according to this embodiment have been described. In the above embodiment, instruction about an individual process for the cooperative service is encrypted by encryption in which only the corresponding server 25 which executes the individual process is allowed to conduct decryption. A "server" to be a unit element in the encryption may be a virtual machine implemented by running an application program, in which a service process is written, on a computer, or may be a hardware device including one or more application programs as described above. In the former, encryption varying from one application program to another will be used, whereas encryption varying from one hardware device to another will be used in the latter. As an example of the encryption varying from one application to another, a mechanism using the public key cryptography in which each application is assigned its own particular pair of private and public keys can be adopted, and the same goes for the encryption varying from one hardware device to another. When the encryption on a hardware device basis is employed, each individual instruction form directed to the hardware device would be such that process details to be carried out in succession by each application contained in the hardware devices are described in orderly sequence. The instruction input unit 10 or the flow controller 20 encrypts each of the individual instruction forms using encryption corresponding to the directed hardware device.

Figure 12:
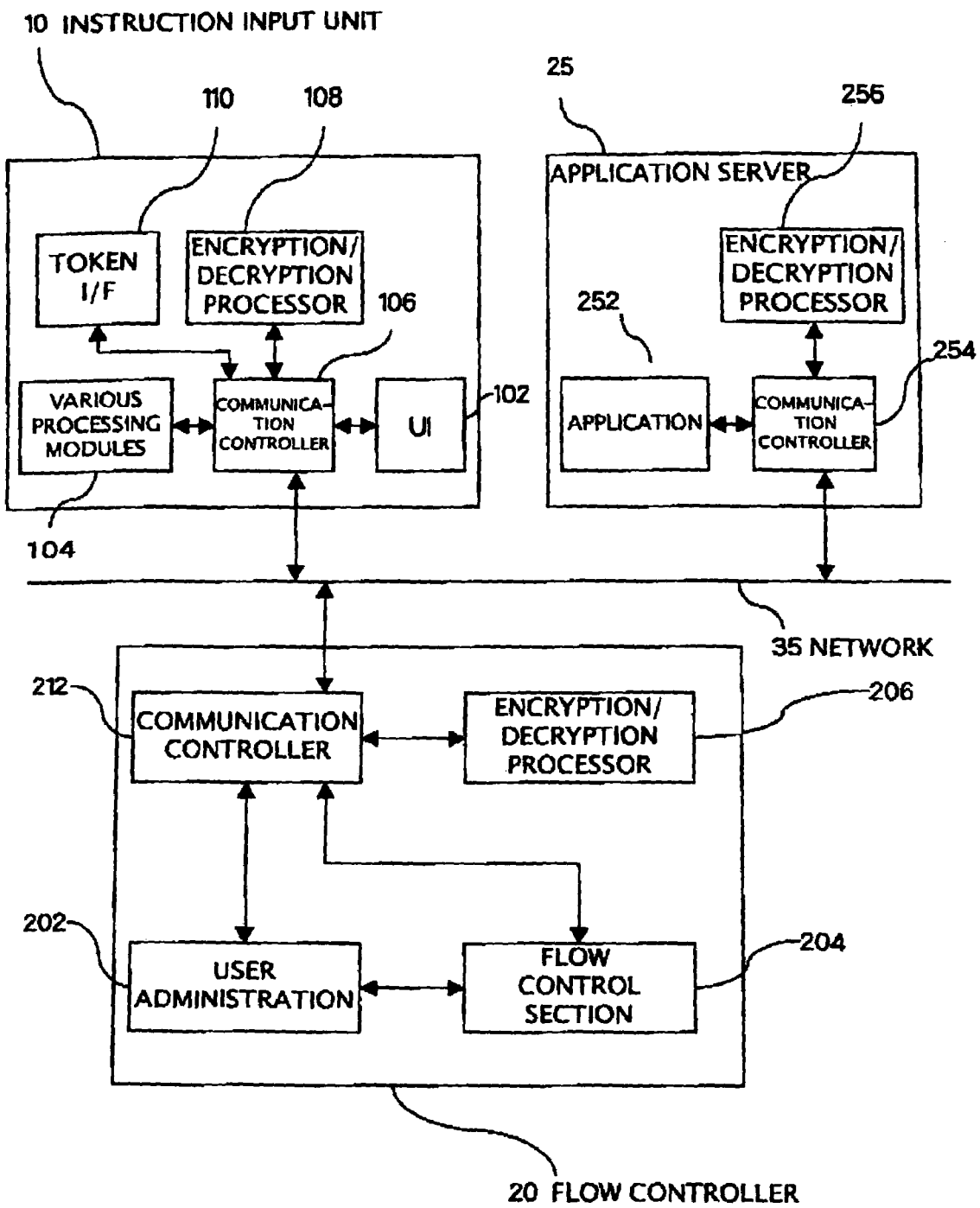
FIG. 12 shows an example of each internal structure of devices constituting the system which provides the cooperative service.

Referring now to FIG. 12, examples of the internal structure of the instruction input unit 10, flow controller 20, and the servers 25 constituting this system will be described.

The instruction input unit 10 is described first. A UI (user interface) 102 in the instruction input unit 10 is a user interface mechanism for displaying status of the instruction input unit 10, a control menu, etc., and accepting user selection of the displayed control menu and parameter input, and comprises, for example, a liquid crystal touch panel, a ten-key numeric pad, and/or various types of directive buttons. A processing module 104 executes a service process provided from the instruction input unit 10 to the user. When the instruction input unit 10 is a multifunction machine, the processing module 104 consists of function modules implementing scanning, printing, copying, facsimile transmission, etc. In this case, the processing module 104 is configured by combinations of a hardware device, such as a scan engine, print engine, or facsimile unit, and a software component which controls each of the hardware devices. A communication controller 106 is a function module capable of executing various types of communications with other devices on a network 35 such as a LAN.

An encryption/decryption processor 108 is a function module capable of encrypting data to be sent from the instruction input unit 10 to the network 35, or decrypting received encrypted data. Here, it is assumed that the encryption/decryption processor 109 supports public key cryptography as an encryption scheme. However, this assumption is used just as an example and the encryption/decryption processor 108 may be configured on the basis of other encryption schemes such as secret key cryptography.

As an example of encryption executed in the encryption/decryption processor 108, a process in which target document data is encrypted using a session key (secret key) generated from random numbers or the like, and the session key is encrypted using a public key for a destination, and then encrypted data containing both the target document and the session key is transmitted to the destination, may be considered. At a receiver site, after obtaining the session key through decryption of the received data using its own private key, encrypted document data is decrypted through the use of the obtained session key. In the specification of this invention, description such as "to encrypt using a public key" should mean to encrypt target data using the session key as described above in addition to using the public key.

The encryption/decryption processor 18 further has the function of attaching a digital signature to data to be transmitted, or verifying the digital signature attached to received data. The digital signature can be obtained by encrypting a message digest created from document data which is a target for the digital signature according to a predetermined digest algorithm such as MD5 (RFC1321) or SHA-1 (RFC3174) with the private key of a signatory. The digital signature is verified by decrypting the signature data through the use of the public key for the signatory and determining whether or not a decrypted result of the data matches the message digest obtained from the document data which is the target for the digital signature according to the predetermined digest algorithm. Matching between them certifies that the document data in question is authentic data from the signatory and that the document data has not been manipulated.

Here, the encryption/decryption processor 108 keeps at least the public key for the flow controller 20. Alternatively, it is preferable to provide the encryption/decryption processor 108 with the function of acquiring public keys for servers or users from, for example, a predetermined certificate authority on a network. Further, the encryption/decryption processor 108 possesses the private key of the instruction input unit 10, which allows the encryption/decryption processor 108 to create the digital signature of the instruction input unit 10.

In the third and fourth instruction sending configurations (shown in FIGS. 5 and 6), the above-described encryption of the instruction forms to be sent to the servers 25 is carried out by the encryption/decryption processor 108. On the other hand, in the first and second instruction sending configurations (shown in FIGS. 3 and 4), encryption of the flow instruction form 50 to be sent to the flow controller 20 is also carried out by the encryption/decryption processor 108.

A token I/F (Interface) 110 is a mechanism of accepting a hardware token owned by a user and communicating with the hardware token to acquire the digital signature created using the private key of the user. In this context, the hardware token is a compact and portable authentication device. In the case of using public key cryptography, the hardware token would comprise, for example, a memory chip in which data on the private key of the user is stored, an arithmetic circuit to generate signature data by encrypting target data for the signature through the use of the private key of the user, and an interface for input of the target data for the signature and output of signature data. Further, the hardware token may be, for example, an IC card of contact or non-contact readout type, a device compliant with various wire interface specifications such as USB (Universal Serial Bus), or a device compliant with various wireless interface specifications such as Bluetooth.

In this configuration, when the need to attach the digital signature of the user to data to be sent arises, the communication controller 106 creates a message digest of the data to be sent according to an algorithm, for example, MD5, and inputs the created message digest into the hardware token mounted on the token I/F 110. The hardware token encrypts the input message digest with the private key of the user and returns encrypted results (i.e. the user signature) to the communication controller 106. Then, the communication controller 106 attaches the user signature to the document data, which attaches the digital signature by the user to the document data.

Having described methods for attaching the digital signature by the user through the use of the hardware token owned by the user, as an alternative method, it is also acceptable for the private key of the user to be pre-stored in the instruction input unit 10 to attach the digital signature of the user using the stored private key in much the same way as the above case of using the hardware token. With this method, in order to ensure the user's private key, it should be necessary control to ask the user to input authentication information such as a password, or biometrics data so as to allow only the user who succeeded in authentication to issue the digital signature. In the configuration using the hardware token, for the cooperative service in which a user signature is necessary, it might be necessary, in a worst-case scenario, to wait in a state where the token is set in the instruction input unit 10 until the cooperative service is completed, whereas in the configuration in which the private key is kept in the instruction input unit 10, such waiting is unnecessary. However, on the other hand, the configuration using the hardware token is beneficial to the user in terms of availability such that the user can execute the cooperative service requiring a user signature from any of the multifunction machines or other devices.

Having described the example configuration of the instruction input unit 10, a computer or a multifunction machine capable of running a program to execute information processing can serve as the instruction input unit 10 by running the program in which the above-described various functions are written.

Next, a configuration of the flow controller 20 will be described. The following description is related to the first and the second instruction sending configuration (refer to FIGS. 3 and 4). For the third and fourth instruction sending configuration (refer to FIGS. 5 and 6), the flow controller 20 is unnecessary.

A user administration 202 in the flow controller 20 manages various kinds of information about a user to whom the flow controller 20 provides the service. Information managed by the user administration 202 contains, for example, authentication information (a password, biometrics data, etc.) used for user certification, and UI screen information registered by the user. More specifically, because the system according to this embodiment allows the user to define a user specific cooperative service by combining services provided by various servers on the network 35, the flow controller 20 provides a user specific UI screen where the user can specify the user specific cooperative service, In the user specific cooperative service, after the user (who might be an individual user or a group consisting of a plurality of individual users) enters the authentication information into the instruction input unit 10 and succeeds in certification, the instruction input unit 10 sends a request asking for a UI screen of the certified user to the flow controller 20. In response to the request, the flow controller 20 sends the UI screen containing the menu for the cooperative service registered by the user to the instruction input unit 10 after encrypting the UI screen with the public key for the user. when the user selects a desired cooperative service on the UI screen appearing on a display of the instruction input unit 10, the user selection is sent from the instruction input unit 10 to the flow controller 20 after being encrypted using the public key for the flow controller 20. After receiving the user selection, the flow controller 20 sends template data on the comprehensive instruction form representing the cooperative service selected by the user to the instruction input unit 10 after encrypting the template data using the public key for the user. The instruction input unit 10, having received the template data, displays an input screen for parameters on the UI 102 and asks the user to input parameters when the template of the comprehensive instruction form contains parameters to be specified by the user. After a series of parameters is entered by the user on the input screen, the instruction input unit 10 completes the comprehensive instruction form, which corresponds to the flow instruction form 50 described above. The instruction input unit 10 encrypts the complete flow instruction form with the public key for the flow controller 20, and then sends the encrypted flow instruction form to the flow controller 20.

Because registration of the cooperative service to the flow controller 20 executed by the user and information on the user specific UI screen provided to the instruction input unit 10 from the flow controller 20 are not directly connected to the main point of this embodiment, explanation thereof is not provided here, yet disclosed in Japanese Patent Application No. 2002-275229, No. 2002-275230, and No. 2002-275231 filed by the present applicant. For detailed explanation, refer to specifications of the above-listed applications if necessary.

It should be noted that although, in this example, the information on the UI screen and the template for the comprehensive instruction form are stored in the flow controller 20 and provided to the instruction input unit 10 when required, the information and the template may be stored in the instruction input unit 10.

A flow control section 204 is a function module capable of making a request asking the servers 25 and the instruction input unit 10 to execute necessary processes according to a flow defined in the cooperative service in order to implement the cooperative service required from the user. In other words, the cooperative service is defined as a flow consisting of at least one process supplied by each of the servers (hereinafter also referred to as a unit job), and the flow controller 20 requests the unit job specified in the flow definition from the corresponding servers in orderly sequence. Upon the completion of the unit job, processed results are returned to the flow controller 20 it necessary, and sent from the controller 20 to the subsequent corresponding server as target data to be processed in the subsequent unit job. The flow control section 204 executes the processes of issuing the request for execution of processing to each of the servers and the multifunction machines and acquiring the processed results.

The instruction input unit 10 may have another processing capability in addition to the capability of receiving instruction for the cooperative service, to thereby provide the additional processing capability for the cooperative service as the case may be. In this case, the instruction input unit 10 can be interpreted as one of the application servers 25 in terms of the additional processing capability.

An encryption/decryption processor 206 is a function module capable of encrypting document data to be sent to the network 35 from the flow controller 20 and decrypting received encrypted data, and has the functions, similar to those of encryption/decryption processor 109, such as encryption, decryption, creating/verifying a digital signature.

Here, the encryption/decryption processor 206 keeps the public keys for the devices such as the instruction input unit 10 and the servers 25, and for the users, or has the function of obtaining the keys from the certificate authority on the network. when the necessity to send data arises, the encryption/decryption processor 206 encrypts the data using the public key for a destination device or a destination user.

In the first and second instruction sending configurations (shown in FIGS. 3 and 4), the encryption/decryption processor 206 carries out the above encryption of the instruction form to be sent to each of the servers 25.

Referring to the function of the digital signature, the encryption/decryption processor 206 possesses the private key of the flow controller 20, and can thereby give the digital signature of the flow controller 20 to data to be sent.

A communication controller 212 is a function module where various types of control for communication between the flow controller 20 and other devices on the network 35 are carried out.

The configuration example of the flow controller 20 has been described up to this point. This type of flow controller 20 can be implemented by running a program, in which the various above-described functions are written, on a computer.

Next, the application server 25 will be described. The application server 25 comprises an application program 252 supporting the providing service of the server 25 itself, a communication controller 254 which controls communication with other devices on the network 35, and an encryption/decryption processor 256 in which encryption and decryption at the time of communication are carried out.

The encryption/decryption processor 256 in the server 25 has the capability of decrypting the instruction form sent from the instruction input unit 10, the flow controller 20 or another server 25 as described above. An application 252 receives decrypted results, interprets the decrypted results, and executes its processing according to interpreted results.

Further, the encryption/decryption processor 256 is also capable of encrypting data obtained through processing of the server 25. At the time of sending the data on processed results to the flow controller 20 or another server 25, the encryption/decryption processor 256 encrypts the data using the public key for the destination.

On the other hand, the communication controller 254 sends the processed results of the application 252 to the flow controller 20 in the first and second instruction sending configurations (shown in FIGS. 3 and 4). Further, in the third instruction sending configuration (shown in FIG. 5), the communication controller 254 executes the process necessary for sending the comprehensive instruction form 60 (and data on the processing results as needed) to the subsequent server 25, whereas in the forth instruction sending configuration (shown in FIG. 6), the communication controller 254 executes the process necessary for sending the instruction of processing start to the subsequent server 25.

With the instruction input unit 10 and the servers 25, or, in the configuration of the flow controller involvement system, the follow controller 20 in addition to those listed above, the above-described flow of the cooperative service can be implemented while employing the process for protecting the confidentiality of the instruction forms to be sent to the servers 25 in the flow.

What is claimed is:

1. An information processor which implements a service by cooperatively operating at least first and second job processors, the first job processor to execute a first job processing in accordance with a first process description defined in instruction data, the second job processor to execute a second job processing, which is a different type of processing from the first processing, in accordance with a second process description defined in the instruction data including the first process description, the information processor comprising:

an encryption processor which encrypts the first and second process descriptions defined in the instruction data so that the first process description is decryptable for the first job processor and is not decryptable for the second job processor, and so that the second process description is decryptable for the second job processor and is not decryptable for the first job processor, and a transmitter which sends the instruction data, in which the first and second process descriptions are encrypted by the encryption processor, to at least one of the first and second job processors, wherein, when the instruction data instructs the second processing to be carried out later than the first processing, the encryption processor encrypts the second process description using a second public key corresponding to a private key of the second job processor, and further encrypts the first process description and the second process description encrypted by the second public key using a first public key corresponding to a private key of the first job processor.

2. An information processor contained in a system which implements a service through cooperative operation of a plurality of job processors, the information processor comprising:

a receiver which receives instruction data, the instruction data including a first process description representing a first processing to be processed by a first job processor and a second process description representing a second processing to be processed by a second job processor, the first process description being decryptable for the first job processor and not being decryptable for the second job processor, the second process description being decryptable for the second job processor and not being decryptable for the first job processor;

a decryption processor which decrypts the first process description in the instruction data received by the receiver;

a processing section that executes the first processing in accordance with the decrypted first process description;

a delete section which deletes the first process description decrypted by the decryption processor from the instruction data, and a transmitter which sends the instruction data, from which the first process description is deleted by the delete section, to the second job processor which subsequently executes the second processing, wherein, when the instruction data instructs the second processing to be carried out later than the first processing, an encryption processor encrypts the second process description using a second public key corresponding to a private key of the second job processor, and further encrypts the first process description and the second process description encrypted by the second public key using a first public key corresponding to a private key of the first job processor.

3. An information processing method carried out by a computer which implements a service by cooperatively operating at least first and second job processors, the first job processor to execute a first job processing in accordance with a first process description defined in instruction data, the second job processor to execute a second job processing, which is a different type of processing from the first processing, in accordance with a second process description defined in the instruction data including the first process description, the information processing method comprising the steps of:

encrypting the first and second process descriptions defined in the instruction data so that the first process description is decryptable for the first job processor and is not decryptable for the second job processor, and so that the second process description is decryptable for the second job processor and is not decryptable for the first job processor, and sending the instruction data, in which the first and second process descriptions are encrypted, to at least one of the first and second job processors, wherein, when the instruction data instructs the second processing to be carried out later than the first processing, the second process description is encrypted using a second public key corresponding to a private key of the second job processor, and the first process description and the second process description encrypted by the second public key are encrypted using a first public key corresponding to a private key of the first job processor.

4. An information processing method carried out by at least one job processor contained in a system which implements a service through cooperative operation of a plurality of job processors in a predetermined order, the information processing method comprising the steps of:

receiving instruction data, the instruction data including a first process description representing a first processing to be processed by a first job processor and a second process description representing a second processing to be processed by a second job processor, the first process description being decryptable for the first job processor and not being decryptable for the second job processor, the second process description being decryptable for the second job processor and not being decryptable for the first job processor;

decrypting the first process description in the received instruction data;

executing the first processing in accordance with the decrypted first process description;

deleting the decrypted first process description from the instruction data; and sending the instruction data, from which the decrypted first process description has been deleted to the second job processor which subsequently executes the second processing, wherein when the instruction data instructs the second processing to be carried out later than the first processing, the second process description is encrypted using a second public key corresponding to a private key of the second job processor, and the first process description and the second process description encrypted by the second public key are further encrypted using a first public key corresponding to a private key of the first job processor.

5. A job processor which carries out a job according to a process description defined in instruction data, the job processor comprising:

an encryption processor which encrypts first and second process descriptions defined in the instruction data for at least one of a first job processor and a second job processor, the first job processor to execute a first job processing in accordance with a first process description defined in the instruction data, and the second job processor to execute a second processing, which is a different type of processing from the first processing, in accordance with the second process description defined in the instruction data including the first process description, so that the first process description is decryptable for the first job processor and is not decryptable for a second job processor, and so that the second process description is decryptable for the second job processor and is not decryptable for the first job processor, and a transmitter which sends the instruction data, in which the first and second process descriptions are encrypted by the encryption processor, to at least one of the first and second job processors, wherein when the instruction data instructs the second processing to be carried out later than the first processing, the second process description is encrypted using a second public key corresponding to a private key of the second job processor. and the first process description and the second process description encrypted by the second public key are further encrypted using a first public key corresponding to a private key of the first job processor.

6. A job processing method in which processing is carried out according to a process description defined in instruction data, the job processing method comprising the steps of:

receiving instruction data, the instruction data including a first process description representing a first processing to be processed by a first job processor and a second process description representing a second processing to be processed by a second job processor, the first process description being decryptable for the first job processor and not being decryptable for the second job processor, the second process description being decryptable for the second job processor and not being decryptable for the first job processor;

decrypting the received first process description;

executing the first processing in accordance with the decrypted first process description;

deleting the decrypted first process description from the instruction data; and sending the instruction data, from which the first process description is deleted, to the second job processor which subsequently executes the second processing, wherein when the instruction data instructs the second processing to be carried out later than the first processing, the second process description is encrypted using a second public key corresponding to a private key of the second job processor, and the first process description and the second process description encrypted by the second public key are further encrypted using a first public key corresponding to a private key of the first job processor.

* * * * *